United States Patent
Jansson et al.

(10) Patent No.: US 7,409,464 B2
(45) Date of Patent: Aug. 5, 2008

(54) SYSTEM AND METHOD FOR CONVERTING COMPACT MEDIA FORMAT FILES TO SYNCHRONIZED MULTIMEDIA INTEGRATION LANGUAGE

(75) Inventors: Cris Jansson, Lewisville, TX (US); Keith Miller, Plano, TX (US)

(73) Assignee: Nokia Corporation, Espoo (FI)

( * ) Notice: Subject to any disclaimer, the term of this patent is extended or adjusted under 35 U.S.C. 154(b) by 823 days.

(21) Appl. No.: 10/976,950

(22) Filed: Oct. 29, 2004

(65) Prior Publication Data
US 2006/0095452 A1    May 4, 2006

(51) Int. Cl.
*G06F 15/16* (2006.01)
(52) U.S. Cl. .................................... 709/246; 709/231
(58) Field of Classification Search ................ 709/231, 709/246
See application file for complete search history.

(56) References Cited

U.S. PATENT DOCUMENTS

| | | | |
|---|---|---|---|
| 2003/0161615 A1* | 8/2003 | Tsumagari et al. | 386/95 |
| 2005/0044499 A1* | 2/2005 | Allen et al. | 715/704 |
| 2005/0245241 A1* | 11/2005 | Durand et al. | 455/414.1 |
| 2006/0029093 A1* | 2/2006 | Van Rossum | 370/432 |
| 2006/0184980 A1* | 8/2006 | Cole | 725/88 |

\* cited by examiner

*Primary Examiner*—Phuoc H Nguyen
(74) *Attorney, Agent, or Firm*—Foley and Lardner LLP

(57) ABSTRACT

A system and method for converting compact multimedia format files to synchronized multimedia integration language while preserving media and timeline information. Media objects and timeline information are extracted from a compact multimedia format file. The media is saved to separate files, and each file may be split into multiple files if the file overlaps a loop boundary. A synchronized multimedia integration language is created from the timing information, including loops, and the media files.

19 Claims, 4 Drawing Sheets

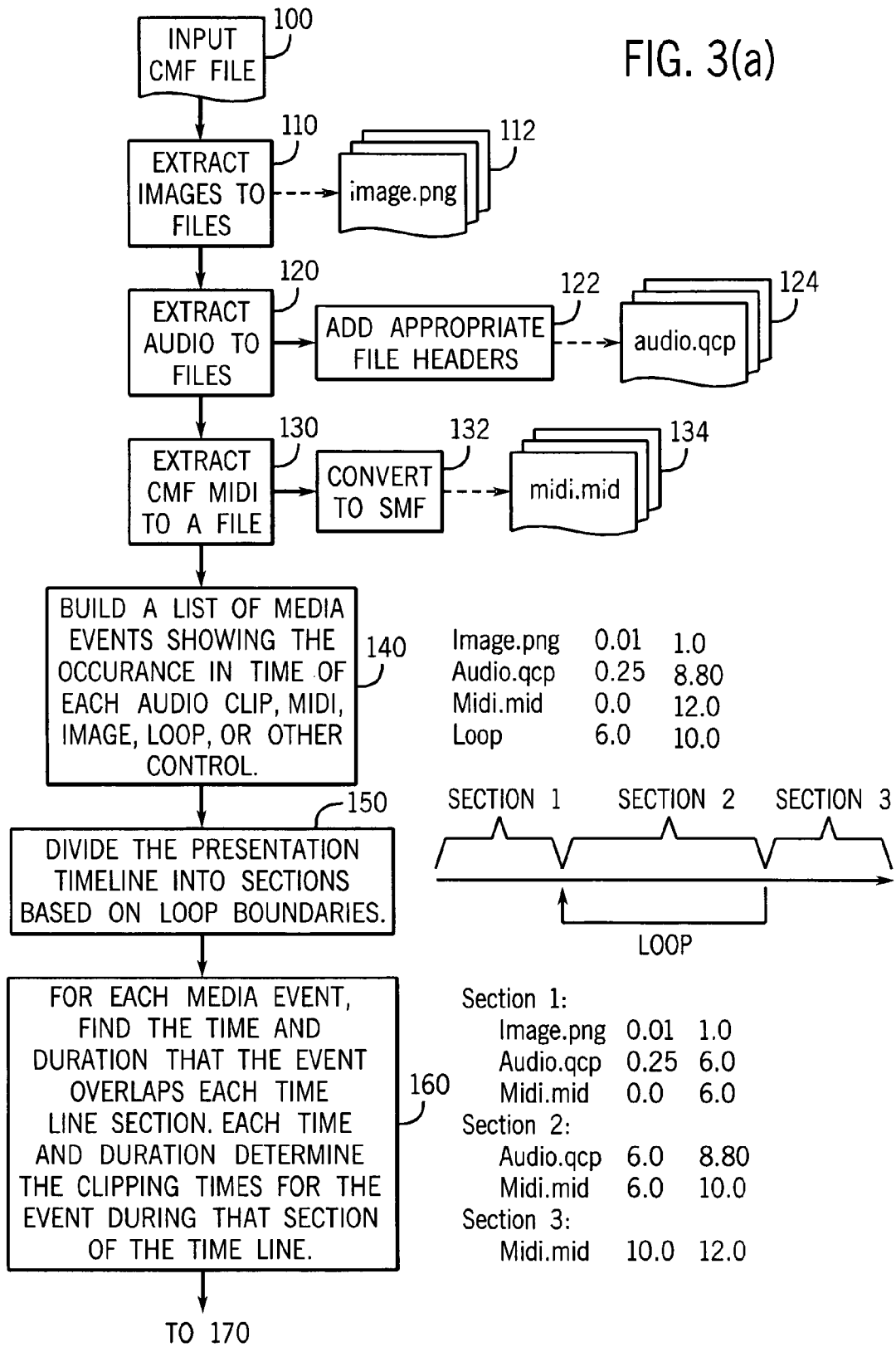

SYSTEM AND METHOD FOR CONVERTING COMPACT MEDIA FORMAT FILES TO SYNCHRONIZED MULTIMEDIA INTEGRATION LANGUAGE

FIELD OF THE INVENTION

The present invention relates generally to the conversion of multimedia files. More particularly, the present invention relates to the conversion of Compact Media Format files to Synchronized Multimedia Integration Language.

BACKGROUND OF THE INVENTION

Compact Media Format (CMF) is used to store and transferring tones and audio/visual presentations. The CMF format is very similar in structure to standard musical instrument digital interface (MIDI) format with extensions for embedding media objects such as images, audio and text. CMF inherently represents the timing information for playback of included media objects. Synchronized Multimedia Integration Language (SMIL) is an XML language that describes the layout and synchronization of media objects in a presentation and is standardized by the World Wide Web Consortium.

Media objects and timing information need to be extracted from a CMF file and restructured into a form consistent with SMIL grammar. The start time and duration of playback of each media object can be determined by parsing the CMF file. However, the use of repeated sections, or loops, within the CMF file becomes a complicating factor because the loop boundaries may occur within media objects, which are handled internally by a CMF player. SMIL does have the capability to repeat playback of media objects, but not with the capability of a CMF player that has random access to the media on a very fine time scale. SMIL references media objects as a whole, although it can specify sub-regions, and passes them to a decoder or player that does not allow random access during playback.

SUMMARY OF THE INVENTION

The present invention involves a system and method for converting a CMF file to a SMIL file while still preserving media features and timeline of the original file. Media objects from the CMF file are extracted and then stored in separate files. Loop information from the CMF file is also extracted, and the timeline of the presentation is divided into sections at loop boundaries. It is then determined if a section boundary occurs in the middle of any media object. If object splitting is used, then any media object that overlays a section boundary is split into two separate objects at the overlap point. If clipping is used, then two sets of clipping points are calculated to describe the division of the object into two regions at the overlap point. A SMIL file is then constructed from the modified timeline that describes the timing and repetition of the media objects. The SMIL and media files are then packaged into a desired format suitable for further use, e.g. network transfer or store into memory.

The present invention provides a number of advantages over conventional systems. The method and system of the present invention maintains the size of the individual files or presentations within a small margin and does not require the recoding of the media after conversion. Additionally, the present invention also minimizes decoding delays within a SMIL presentation. In the case of a wireless service provider, the provider can use a software application to automate the conversion of an existing library of CMF files to SMIL presentations, which could then be offered to subscribers that have SMIL-capable devices. The conversion process of the present invention could be completed in a wide variety of electronic devices including, but not limited to, a personal computer, a computer server, a cellular telephone, or other devices. Telecommunication capability is not required for implementation of the present invention.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 3(a) and 3(b) show a flow chart showing the process for converting a CMF file to a SMIL file according to one embodiment of the present invention.

DETAILED DESCRIPTION OF THE PREFERRED EMBODIMENTS

As discussed above, the present invention is directed to a system and method for converting a CMF file to a SMIL file while still preserving media features and timeline for the original file.

Figure 1:
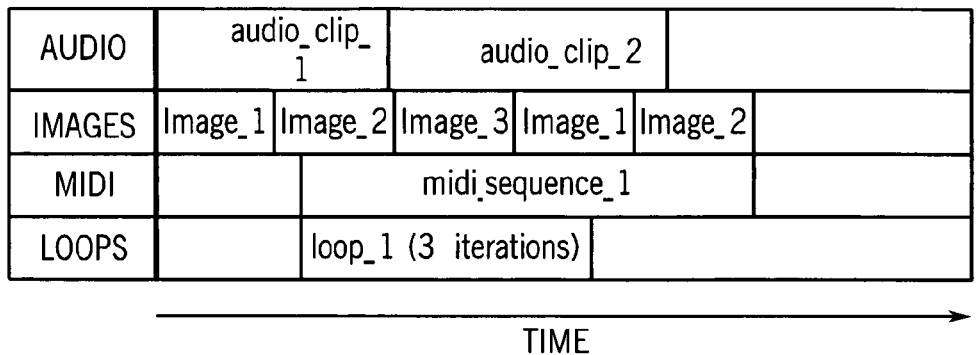
FIG. 1 is a representation of a present structure for a sample CMF file.

A CMF file can be logically thought of as a collection of tracks, usually one for each of audio, images, and MIDI. All tracks begin at time zero and occur simultaneously. Tracks contain a series of objects, each of which have non-overlapping placement on the track. An object is a reference to a piece of media that is played during that time. Sections of a CMF file may repeat in a loop, and for convenience, loops are treated the same as the other objects. FIG. 1 shows an assortment of objects corresponding to events in a generic CMF file.

SMIL is a language for describing the structure of multimedia objects in a presentation. SMIL allows the objects to be referenced by name, along with several possible attributes that affect timing. The body of a SMIL description includes blocks of XML elements that express the timing of the media objects. Two elements in particular, <seq> and <par>, perform sequential and parallel playback of their subordinate elements, respectively.

Figure 3B:
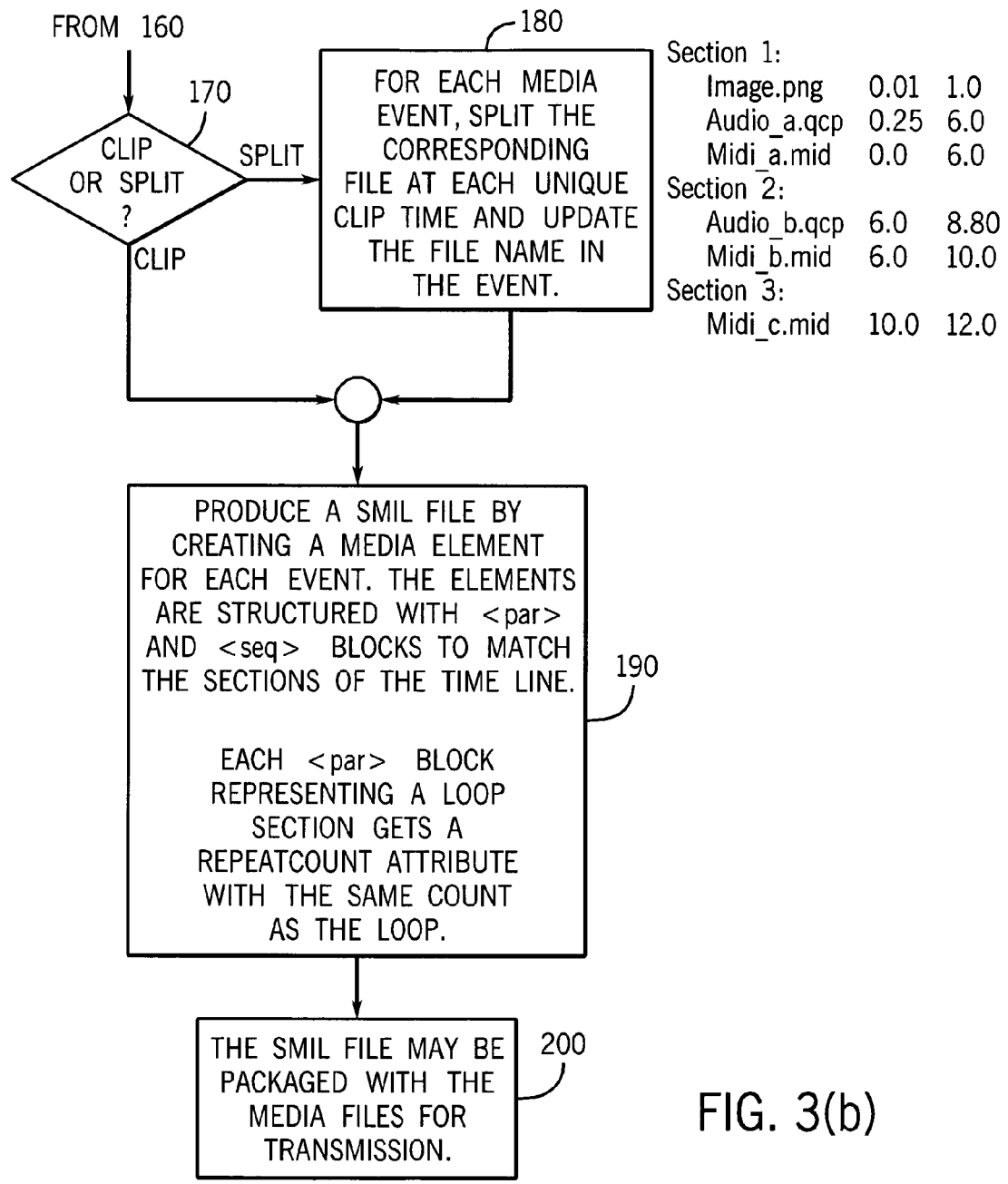

FIGS. 3(a) and 3(b) show a flow chart of the process of converting a CMF file to a SMIL file according to one embodiment of the present invention. At step 100 in FIG. 3(a), a generic CMF file is input into the system. The first step in the conversion process, according to one embodiment of the present invention, involves the extraction of the media objects from the CMF file and storing them in separate files. This is represented at steps 110, 120 and 130 for images, audio clips and MIDI clips, respectively, in FIG. 3(a). The format of the files should match the supported formats of the target platform. Any necessary conversion is also completed at this point. Most conversions simply involve a change of file format or audio encoding method. However, MIDI content may have to be translated into a standard MIDI file format. CMF uses a unique format for MIDI that can be converted to a SMF file at step 132, which leads to the properly formatted file named midi.mid at step 134. In the case of an image, the image is stored e.g. as a PNG file at step 112. For audio files, appropriate headers are added at step 122, which leads to the audio being converted to e.g. QCP files at step 124. It should be noted that, although FIG. 3 shows the extraction as occurring sequentially with images, audio and MIDI, the extraction could occur in any order or could occur simultaneously for all three types of media. Other media image and audio formats supported by CMF are similarly treated.

The next step in the conversion process, according to one embodiment of the present invention, involves the building of a list of media events showing the occurrence in time of each audio clip, MIDI, image, possible loop or control event. This is represented at step 140. The timeline of the presentation is then divided into sections at step 150, in one exemplary embodiment of the invention, according to the endpoints of any possible loops (also referred to as loop boundaries) defined in the CMF file. SMIL is able to repeat parts of the presentation by using the "repeatCount" or "repeatDur" attribute of a <seq> or <par> block. This creates the requirement that the timeline must be sectioned, by the loop endpoints by example, thus allowing repeated sections to be placed into a block.

In one embodiment of the invention, not all the tracks in the CMF file are converted into SMIL presentation. As an example, the device in which the conversion is performed may not have the capability to reproduce audio and MIDI files simultaneously. If this is the case, there is no need to include both these tracks into the SMIL presentation. Thus it is not necessary to converted both files into the SMIL presentation. This can be implemented either by not extracting corresponding information from the CMF file or leaving either of the tracks out from the resulting SMIL presentation.

At step 160, according to one embodiment of the invention, for each media event, the time and duration that the event overlaps each timeline section is determined. The determined time and duration are used to determine the clipping times for the event during that particular section of the timeline, as is discussed below.

Media objects that overlap the endpoints are subject to being started or stopped at the endpoint time instead of the beginning or end of the object. Two methods are available to handle this, and this decision is represented at step 170 in FIG. 3(*b*). The first method is to specify clipping times for each media object. For example, the SMIL segment to play just the audio track is:

```
<audio src="audio_1" />
<audio src="audio_2" clipEnd="4.5" repeatCount="3" />
<audio src="audio_2" clipBegin="4.5" />
```

Figure 2:
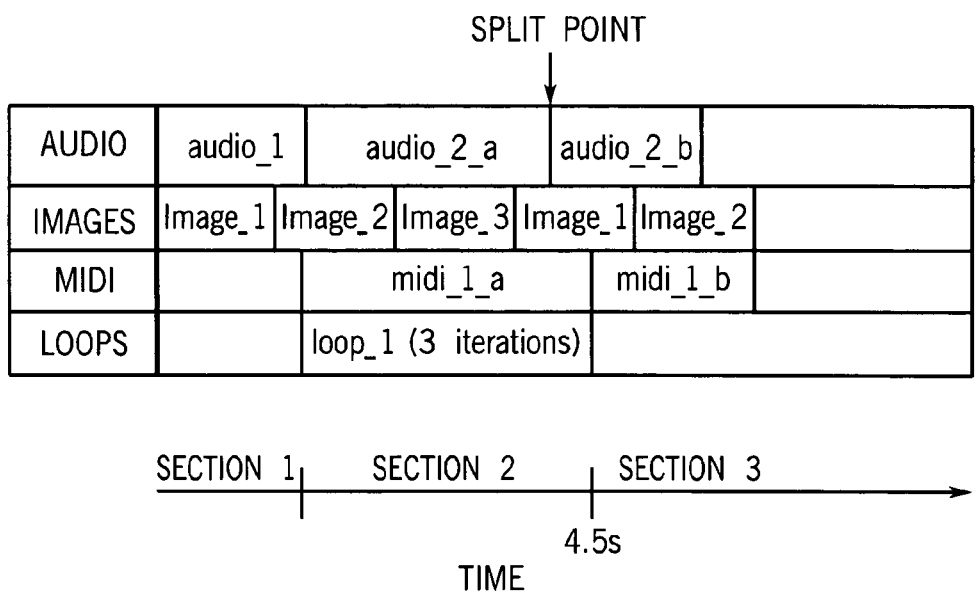
FIG. 2 is a representation of a modified structure showing split media objects.

Although this is a relatively simple method, a SMIL player may experience long delays if it skips over large parts of the media. The alternative, represented at step 180 according to one embodiment of the invention, is to split the media object into two or more pieces, and then correct any references to it by updating the file name in the event. Each type of media requires a specific algorithm to perform the split. This method avoids the clipping delay problem by having each piece of media start playing at the beginning. For example, the media object audio_2 in FIG. 1 is split at time 4.5 s into two objects, audio_2_*a* and audio_2_*b* in FIG. 2. The SMIL segment to play the audio track therefore becomes:

```
<audio src="audio_1" />
<audio src="audio_2_a" repeatCount="3" />
<audio src="audio_2_b" />
```

The framework for the presentation is built from nested blocks. The entire timeline is contained within a <seq> block that plays each section in order. The tracks within a section are contained within a <par> block since they play simultaneously. Each track in a section is represented by a <seq> block to play the objects within the track in order. The completed SMIL for the presentation is as follows:

```
<smil xmlns="http://www.w3.org/2001/SMIL20/Language">
<head>
<layout>
<root-layout width="120" height="96" backgroundColor="white" />
<region id="alpha" left="0" top="0" width="120" height="96" />
</layout>
</head>
<body>
<seq>
  <par>
    <seq>
      <img src="image_1" alt="ID0" region="alpha"
        begin="0.0" fill="freeze" />
      <img src="image_2" alt="ID1" region="alpha"
        begin="2.0" fill="freeze" />
    </seq>
    <seq>
      <audio src="audio_1" begin="0.0" />
    </seq>
  </par>
  <par repeatCount="3">
    <seq>
      <img src="image_3" alt="ID2" region="alpha"
        begin="1.8" fill="freeze" />
      <img src="image_1" alt="ID3" region="alpha"
        begin="2.0" fill="freeze" />
    </seq>
    <seq>
      <audio src="audio_2_a" begin="0.0" />
    </seq>
    <seq>
      <audio src="midi_1_a" begin="0.0" />
    </seq>
  </par>
  <par>
    <seq>
      <img src="image_2" alt="ID3" region="alpha"
        begin="1.0" fill="freeze" />
    </seq>
    <seq>
      <audio src="audio_2_b" begin="0.0" />
    </seq>
    <seq>
      <audio src="midi_1_b" begin="0.0" />
    </seq>
  </par>
</seq>
</body>
</smil>
```

The conversion produces a SMIL file, as discussed above at step 190. Each <par> block representing a loop section has a RepeatCount attribute with the same number of iterations as the loop. It should be noted that this structure of the <seq> and <par> blocks and the placement of the RepeatCount attributes may be transformed into logically equivalent structures when circumstances permit. At step 200, the SMIL file may be packaged with the media files for transmission.

Figure 4:
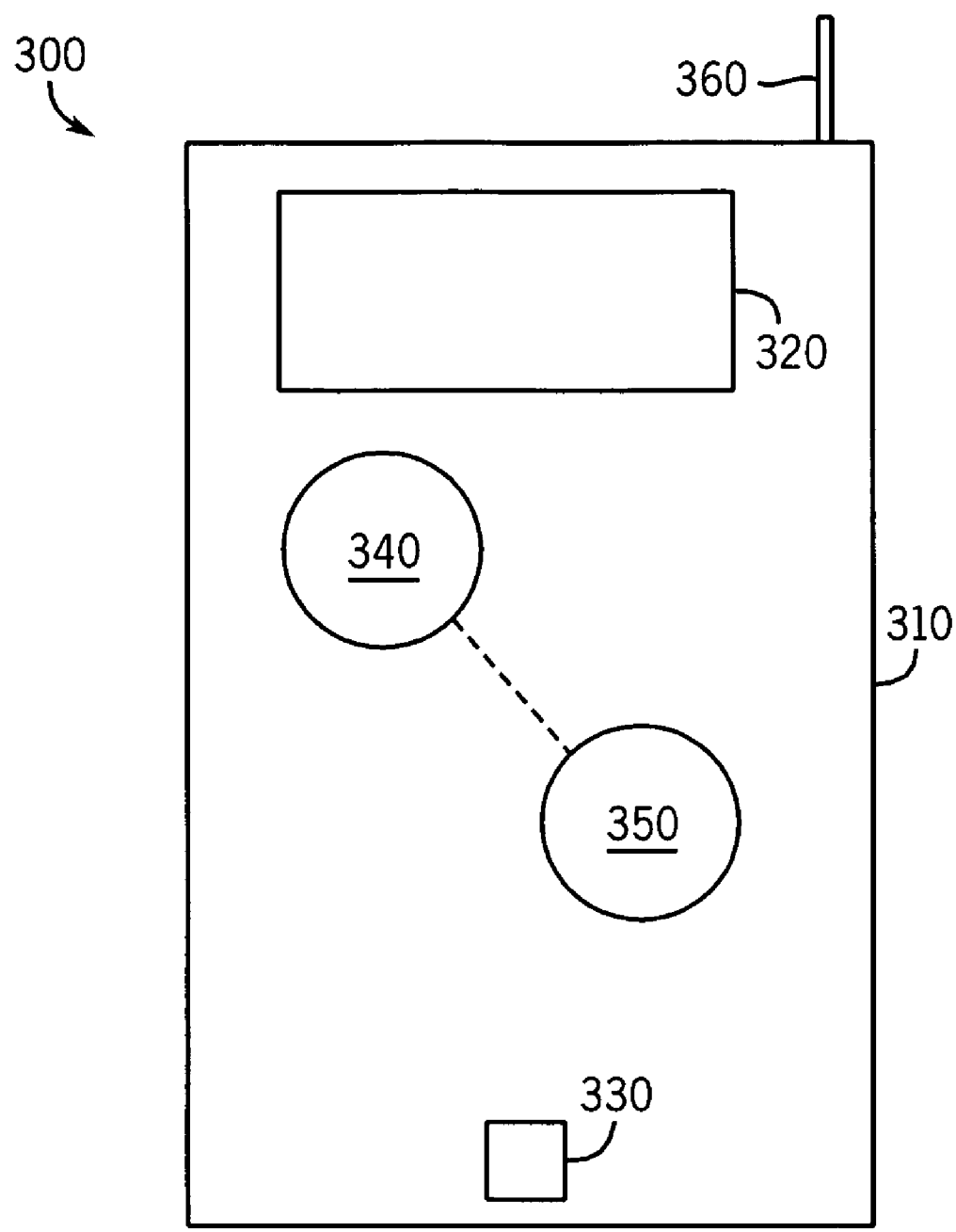
FIG. 4 is a representation of a generic electronic device in which the present invention may be implemented.

FIG. 4 shows a generic electronic device at 300 in which the present invention may be implemented. The electronic device 300 includes a body 310 which houses both a memory unit 340 for storing computer program code and a processor for executing the program code. The electronic device 300 may also include a display 320 for displaying images and/or a speaker 330 for playing audio and/or MIDI files. The electronic device 300 may also include a data communication link, in either wired or wireless form, for communicating with a remote terminal. The generic electronic device may not necessarily consume the resulting SMIL presentation itself, but instead may store and/or forward it for use in another device.

While several embodiments have been shown and described herein, it should be understood that changes and modifications can be made to the invention without departing from the invention in its broader aspects. Various features of the invention are defined in the following Claims.

What is claimed is:

1. A method of converting a Compact Media Format (CMF) presentation to a Synchronized Multimedia Integration Language (SMIL) presentation, the method comprising:
    extracting at least one media object from the CMF presentation;
    extracting at least a portion of loop information from the CMF presentation;
    dividing the CMF presentation into a plurality of sections;
    determining whether at least one section boundary occurs within at least one media object;
    if it is determined that at least one section boundary occurs within at least one media object:
    splitting that at least one media object into a plurality of components;
    correcting references to that at least one media object to reflect the plurality of components; and
    converting the CMF presentation to the SMIL presentation based on the determination.

2. The method of claim 1, further comprising if it is determined that at least one section boundary occurs within at least one media object, designating at least one clipping time for that at least one media object.

3. The method of claim 1, wherein the CMF presentation is divided into a plurality of sections at loop boundaries.

4. The method of claim 1, wherein the at least one media object is structured with <par> and <seq> blocks to match the plurality of sections.

5. The method of claim 4, wherein the <par> block representing a section is provided with a RepeatCount attribute with the same count as a loop.

6. The method of claim 1, further comprising after extracting the at least one media object, storing the at least one media object in a separate file based upon object type.

7. A computer program product embodied in a computer readable medium for converting a Compact Media Format (CMF) presentation to a Synchronized Multimedia Integration Language (SMIL) presentation, comprising:
    computer code for extracting at least one media object from the CMF presentation;
    computer code for extracting at least a portion of loop information from the CMF presentation;
    computer code for dividing the CMF presentation into a plurality of sections;
    computer code for determining whether at least one section boundary occurs within at least one media object;
    computer code for splitting a media object into a plurality of components if it is determined that at least one section boundary occurs within that media object;
    computer code for correcting references to that media object to reflect the plurality of components; and
    computer code for converting the CMF presentation to the SMIL presentation based on the determination.

8. The computer program product of claim 7, further comprising computer code for, for designating at least one clipping time for a media object if it is determined that at least one section boundary occurs within that media object.

9. The computer program product of claim 7, wherein the CMF presentation is divided into a plurality of sections at loop boundaries.

10. The computer program product of claim 7, wherein the at least one media object is structured with <par> and <seq> blocks to match the plurality of sections.

11. The computer program product of claim 10, wherein the <par> block representing a section is provided with a RepeatCount attribute with the same count as a loop.

12. The computer program product of claim 7, further comprising computer code for, after extracting the at least one media object, storing the at least one media object in separate file based upon object type.

13. An electronic device, comprising:
    a memory; and
    at least one processor for processing information stored in the memory;
    wherein the memory includes a computer program product for converting a Compact Media Format (CMF) presentation to a Synchronized Multimedia Integration Language (SMIL) presentation, comprising:
    computer code for extracting at least one media object from the CMF presentation;
    computer code for extracting at least a portion of loop information from the CMF presentation;
    computer code for dividing the CMF presentation into a plurality of sections;
    computer code for determining whether at least one section boundary occurs within at least one media object;
    computer code for splitting a media object into a plurality of components if it is determined that at least one section boundary occurs within that media object;
    computer code for converting references to that media object to reflect the plurality of components; and
    computer code for converting the CMF presentation to the SMIL presentation based on the determination.

14. The electronic device of claim 13, wherein the computer program product further comprises computer code for designating at least one clipping time for a media object if it is determined that at least one section boundary occurs within that media object.

15. The electronic device of claim 13, wherein the at least one media object is structured with <par> and <seq> blocks to match the plurality of sections.

16. The electronic device of claim 15, wherein the <par> block representing a section is provided with a RepeatCount attribute with the same count as the loop.

17. A module for use with an electronic device, comprising:
    a memory; and
    at least one processor for processing information stored in the memory;
    wherein the memory includes a computer program product for converting a Compact Media Format (CMF) presentation to a Synchronized Multimedia Integration Language (SMIL) presentation, comprising:
    computer code for extracting at least one media object from the CMF presentation;
    computer code for extracting at least a portion of loop information from the CMF presentation;

computer code for dividing the CMF presentation into a plurality of sections;

computer code for determining whether at least one section boundary occurs within at least one media object;

computer code for splitting a media object into a plurality of components if it is determined that at least one section boundary occurs within that media object;

computer code for correcting references to that media object to reflect the plurality of components; and computer code for converting the CMF presentation to the SMIL presentation based on the determination.

18. The module of claim 17, wherein at least one media object is structured with <par> and <seq> blocks to match the plurality of sections.

19. The module of claim 18, wherein the <par> block representing a section is provided with a RepeatCount attribute with the same count as a loop.

* * * * *